(12) United States Patent
Collard

(10) Patent No.: US 6,594,982 B1
(45) Date of Patent: Jul. 22, 2003

(54) MECHANICAL LEAF STRIPPER OPERATING ON COMPRESSED GAS

(75) Inventor: Michel Collard, Bouzy (FR)

(73) Assignee: Etablissements Collard SA, Societe Anonyme a directoire et conseil de surveillance, Bouzy (FR)

( * ) Notice: Subject to any disclaimer, the term of this patent is extended or adjusted under 35 U.S.C. 154(b) by 0 days.

(21) Appl. No.: 09/763,686

(22) PCT Filed: Jun. 23, 2000

(86) PCT No.: PCT/FR00/01779
§ 371 (c)(1),
(2), (4) Date: Feb. 22, 2001

(87) PCT Pub. No.: WO01/00008
PCT Pub. Date: Jan. 4, 2001

(30) Foreign Application Priority Data

Jun. 24, 1999 (FR) .............................. 99 08204

(51) Int. Cl.⁷ .............................................. A01D 46/00
(52) U.S. Cl. ..................................... 56/328.1; 56/327.1
(58) Field of Search .............................. 56/328.1, 327.1

(56) References Cited

U.S. PATENT DOCUMENTS 3,006,131 A * 10/1961 McDowell ................. 56/328.1
3,871,040 A * 3/1975 Marasco .................... 56/328.1
4,134,250 A * 1/1979 Scheffler .................... 56/328.1
4,175,368 A * 11/1979 Scheffler .................... 56/328.1

FOREIGN PATENT DOCUMENTS

| FR | 2289112 | 11/1974 |
| FR | 2543792 | 3/1983 |
| FR | 2712461 | 11/1993 |

OTHER PUBLICATIONS

Derwent Patent Abstract for FR 2543729A.*

Derwent Patent Abstract for FR 2712461.*

* cited by examiner

Primary Examiner—Thomas B. Will
Assistant Examiner—Meredith Petravick
(74) Attorney, Agent, or Firm—Pearne & Gordon LLP

(57) ABSTRACT

A leaf stripper includes several nozzles mounted at the end of branch pipes that are radially integral with a rotary compressed gas dispenser. The nozzles move along concentric circles with different radii behind a vegetation deflector. The deflector includes gas jet circulating and controlling structures such as circular slots with radii corresponding to that of the circumferences described by the nozzles.

9 Claims, 5 Drawing Sheets

MECHANICAL LEAF STRIPPER OPERATING ON COMPRESSED GAS

This invention concerns a compressed-gas mechanical defoliator, designed to remove all or some of the leaves from plants, particularly vines.

Compressed-gas mechanical defoliators are already known that have many advantages compared to the processes and devices used before, namely manual, mechanical, chemical and thermal defoliators.

In particular, a compressed-gas mechanical defoliator is known and described in document FR 2.543.792 which has nozzles located at the end of pipes interlocked radially with a rotary distributor, so that said nozzles describe a circular trajectory. During one or more parts of this trajectory, the defoliator is able to blow on the vegetation, since said nozzles turn behind a cap that constitutes a deflector for the vegetation. The cap has one or more circular slots with the same radius corresponding to the trajectory of the nozzles, so as to limit their zones of action. It is also possible for the distributor to be adapted to supply air only when the nozzles describe a given angular sector.

This defoliator, although it has a higher yield than the others, has many disadvantages. Indeed, the pressure needed for defoliation is too great, which causes injuries to the fruit and seeds. This phenomenon is amplified by the high temperature of the air blown, which can reach 130° C.

The yield of this defoliator is also insufficient. Indeed, since rotation of the nozzles is combined with displacement of the drive vehicle that carries it, said nozzles pass over the same place on the vegetation only once or not many times, which often makes it necessary to make a second pass or be satisfied with limited defoliation.

A compressed-gas rotary distributor with different jets is also known for agricultural machines to defoliate trees and bushes, as described in patent FR 2.712.461. This distributor has different curved pipes, equipped with a nozzle that blows air around through circular holes made in a case toward the trees or plants, so as to eliminate only the leaves in front of the fruit-bearing zone by lifting them up.

On this device, special orientations are given the nozzles during construction, by appropriately bending the pipes upstream from said nozzles; however, these orientations, defined a priori, do not always make it possible to obtain a satisfactory yield.

Generally speaking, a defoliator is installed on a drive vehicle, with or without a tractor, whose force drives an air compressor; its disadvantage is a sometimes large variation in air pressure, which is a function of the power of the drive and/or tractor and the contour of the ground, given that the compressor is not driven at constant speed. Now, for effective defoliation, it is preferable to have control of the air pressure.

The goal of this invention is to fix these disadvantages. This invention, as it is characterized, solves the problem, which consists of creating a compressed-gas mechanical defoliator with which, on one hand, the air pressure can be controlled all during defoliation, whatever the conditions under which it is done and, on the other hand, the leaves to be eliminated are stressed effectively enough to obtain maximum elimination of the leaves in a single pass.

The type of compressed-gas mechanical defoliator in the invention, which has at least one nozzle mounted on the end of a pipe interlocked radially with a compressed gas rotary distributor turning behind a vegetation deflector, is mainly characterized by the fact that it has several nozzles distributed over different concentric circles, by the fact that the vegetation deflector has means of allowing controlled passage of the compressed gas jets and by the fact that it is equipped with means of regulating the gas pressure in relation to an adjustable set point during defoliation from the operator's post of the vehicle carrying it.

Preferably, the distance between nozzles in relation to the Y axis of rotation of the compressed gas distributor, their inclination and orientation are adjustable.

In one embodiment, the means for controlled passage of the compressed gas jets through the vegetation deflector is composed of circular slots, with a radius corresponding to that of the circular trajectories described by the nozzles. These circular slots can be made in a mask that can be detached, making it possible to change the characteristics of the slots by simple permutation to adapt them to different defoliation situations.

In a second embodiment, the means of controlled passage for the compressed gas jets is composed of a perforated disk, interlocked in rotation with the nozzles, mounted in a circular opening with a corresponding diameter made in the wall of the deflector coaxial to the Y axis of the distributor.

In a third embodiment, the means of controlled passage of the compressed gas jets is composed of a grid.

In a process designed mainly for defoliating vines, this is done simultaneously by two defoliation heads located one behind the other with a certain vertical offset Z.

The nozzles can be inclined in relation to the Y axis of rotation of the distributor, at an angle between 0 and 45°, preferably 15°.

The device, which allows the distance and/or inclination of the nozzles to be regulated in relation to the Y axis of rotation of the distributor, is comprised of sleeves with a clamping chuck attached radially to the distributor, in which the feed pipes for the compressed gas nozzles are slide-mounted, and semicircular rings with multiple adjustment orifices, attached perpendicular to the pipes. An indexing rod parallel to each sleeve and interlocked with it freely penetrates a particular orifice. The adjustment orifices are distributed over a radius corresponding to the one described by the indexing rod and their angular deviation is 5°.

The device that allows the orientation of the nozzles to be adjusted is comprised of a ring with peripheral notches attached perpendicular to the base of the nozzles, in relation to which their tip forms, by construction, a predetermined angle. The base of the nozzles is encased in the curved end of the pipes which have, at their outlet, a circular adjustment flange for orienting the tip of the nozzle and attaching it by means of at least one screw that goes into one of the notches on the adjustment ring, after the nozzle is oriented in the chosen direction.

The advantages derived from this invention consist basically of the fact that all the parameters involved in the quality of the defoliation. This consequently makes it possible to adapt it to special conditions associated with the nature of the vegetation, its level of development and meteorological conditions. These parameters are adjustable, for the most part, on site, with the possibility of modulating the pressure of the compressed gas during defoliation, to take into account certain changes in the initial conditions determined, such a the arrival of rain, for example.

Other characteristics and advantages will appear in the following description of a defoliator for vines with four nozzles distributed evenly over two concentric circles turning behind a vegetation deflector with two concentric semicircular slots, given as a non-limiting example, using the attached drawings in which.

Figure 1:
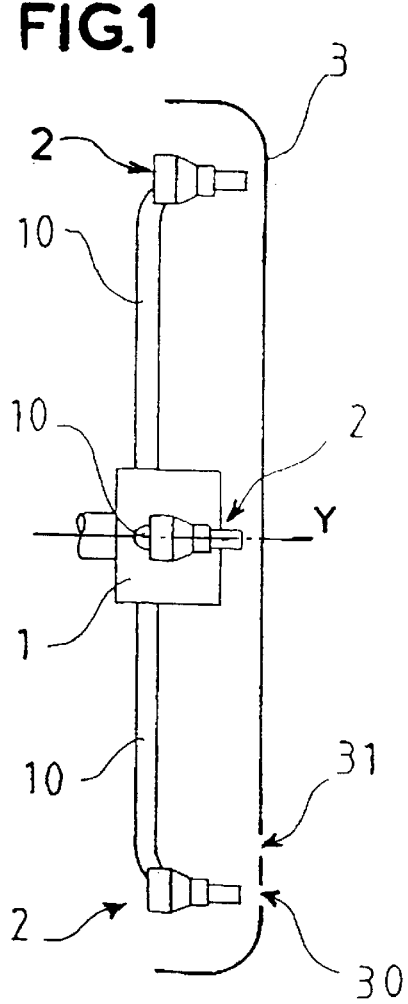
FIG. 1 is a schematic side view of the defoliator in cross section.
Figure 2:
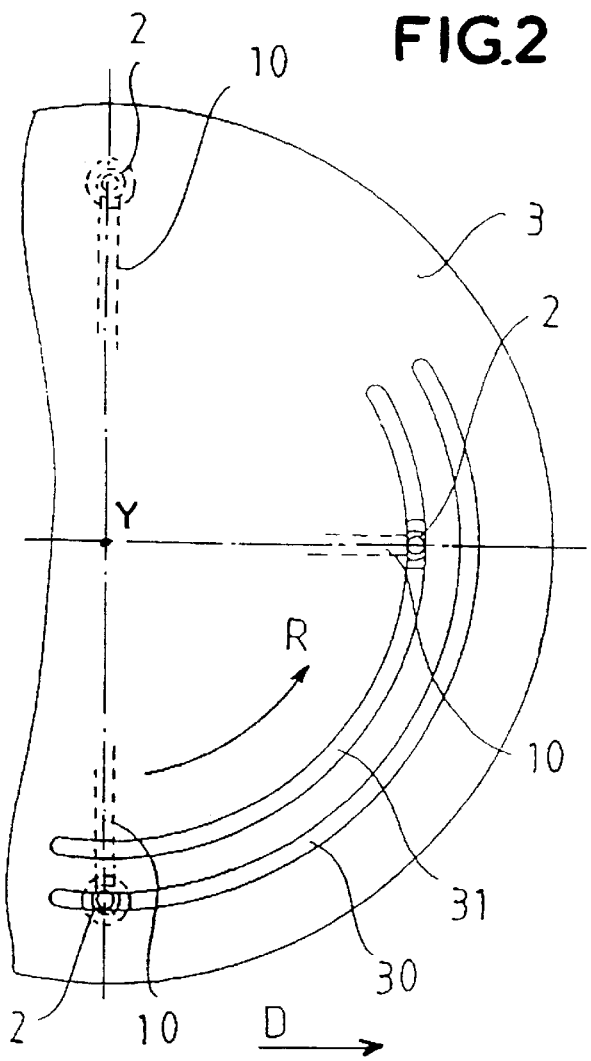
FIG. 2 is a schematic partial front view of the defoliator.

The figures show the defoliator for vines given as an example, having a rotary distributor 1, to which are connected pipes 10, equipped with nozzles 2, located behind a vegetation deflector 3, equipped with sectorial slots 30, 31 that can be made in a mask 32 that makes it possible to limit locally the action of the compressed gas jets.

This configuration makes it possible, by combining the displacement, in the direction of arrow D, of the tractor that holds the defoliator, and the rotation, in the direction of arrow R, of the nozzles 2, to blow several times in a row in the same place, thus avoiding a second pass or getting more intensive defoliation in a single pass.

Note that it is possible to replace slots 30 and 31 with a single wider slot covering the two trajectories.

On the other hand, in the embodiment shown, slots 30 and 31 cover an angle of around 120°. It is, of course, possible for them to cover a different angle.

Figure 3:
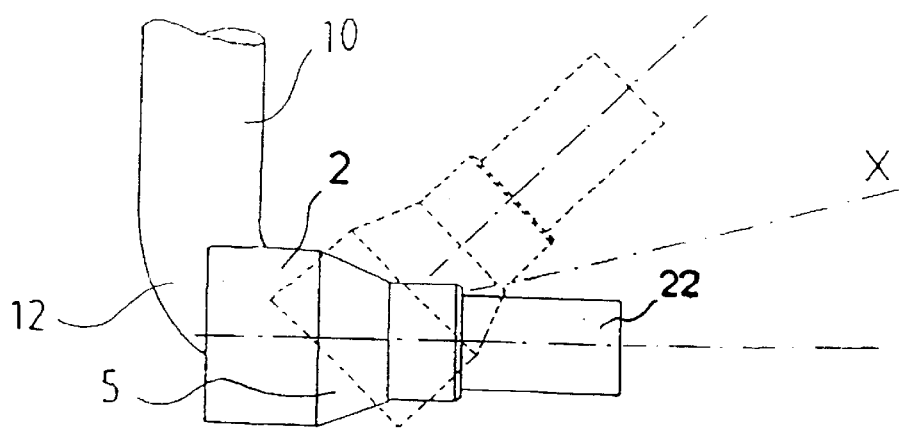
FIG. 3 is a schematic side view of a nozzle mounted on the end of a pipe.

Now, if we refer to FIG. 3, we can see that the axis of the compressed air jet can have various orientations by changing the position of the nozzle in relation to the bend 12 in the pipe 10.

Thus, the jet can form an angle between 0 and 45° with the perpendicular to the pipe 10, knowing that preferably that angle is 15°, and this position is shown by an axis X.

However, the effectiveness of the blowing, when the nozzles are located in these different angular positions, is associated with the placement of slots 30 and 31. Thus, effective defoliation is obtained, on one hand, when the blowing is done at an angle, as defined previously, between 0 and 45°, preferably 15°, and on the other hand, when slots 30 and 31 are located in the front part of the deflector 3, and on the other hand, when the direction of rotation R of the distributor 1 makes the nozzles 2 blow from slots 30 and 31 up and down as the distributor 1 rotates.

Thus, in this example, the deflector 3 pins down the leaves, which are taken by the compressed gas jets back and forth by the angle of the jets and up or down according to the position during rotation R of the nozzles. This is one of the possible configurations that makes it possible to obtain effective defoliation.

Coming out of the compressor which supplies the nozzles with compressed gas, the defoliator in the invention also has a system for regulating the pressure that includes, besides a manometer for controlling the pressure, a safety valve that can be set at a given pressure and a valve that can be maneuvered manually or electronically from the tractor control post.

The regulation system make it possible to regulate the pressure, which must be adapted to the type of vegetation to be treated, the period involved and the parameters of the tractor that carries the defoliator and drives the compressor supplying it.

Figure 4:
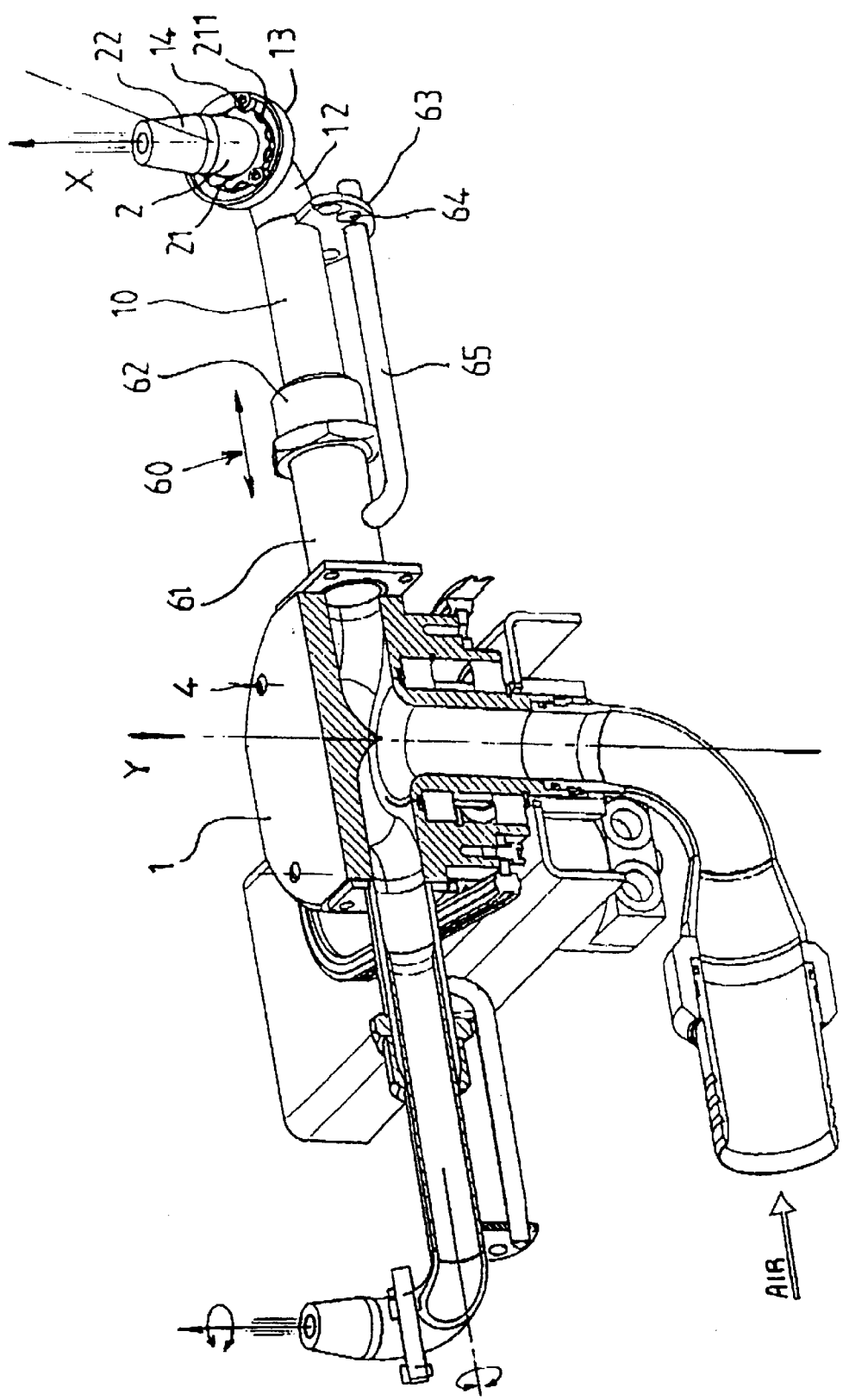
FIG. 4 is a perspective side view, partially sectioned, of a compressed gas rotary distributor, equipped with means of adjusting the deviation, inclination and orientation of the nozzles.

Now, looking at FIG. 4, we can see that the nozzles 2 attached to the ends of the pipes are attached to the distributor 1 by a device 60 for adjusting their deviation and their inclination in a plane perpendicular to said pipes, by sleeves 61, attached radially to the distributor 1 having on their ends a clamping chuck 62 in which the pipes are slide-mounted and semicircular rings 63 with adjustment orifices 64 attached perpendicular to the pipes 10, into one of which penetrates an indexing rod 65, attached to each sleeve 61, parallel to it. It should be emphasized that another way of adjusting the orientation of the nozzles 2 in relation to their respective pipes 10 has been provided, which consists of a ring 21 with peripheral notches 211 attached perpendicular to the base 5 of the nozzle 2 in relation to which the tip 22 of the nozzle 2 forms, by construction, a predetermined angle, with the base 5 of the nozzle 2, which, in this embodiment, is encased in the bent end 12 of the pipe 10, which has, at its outlet, a flange 13 for adjusting the orientation and attachment of the nozzle 2 by the play of at least one screw 14 that goes into one of the notches 211 of the adjustment ring 21, after having oriented the tip 22 of the nozzle 2 in the chosen direction and interlocking said nozzle 2 in relation to its pipe 10. As can be seen, it is therefore possible to position the nozzles 2 radially and give them special inclinations radially and transversely in relation to the Y axis of the distributor 1.

Figure 5:
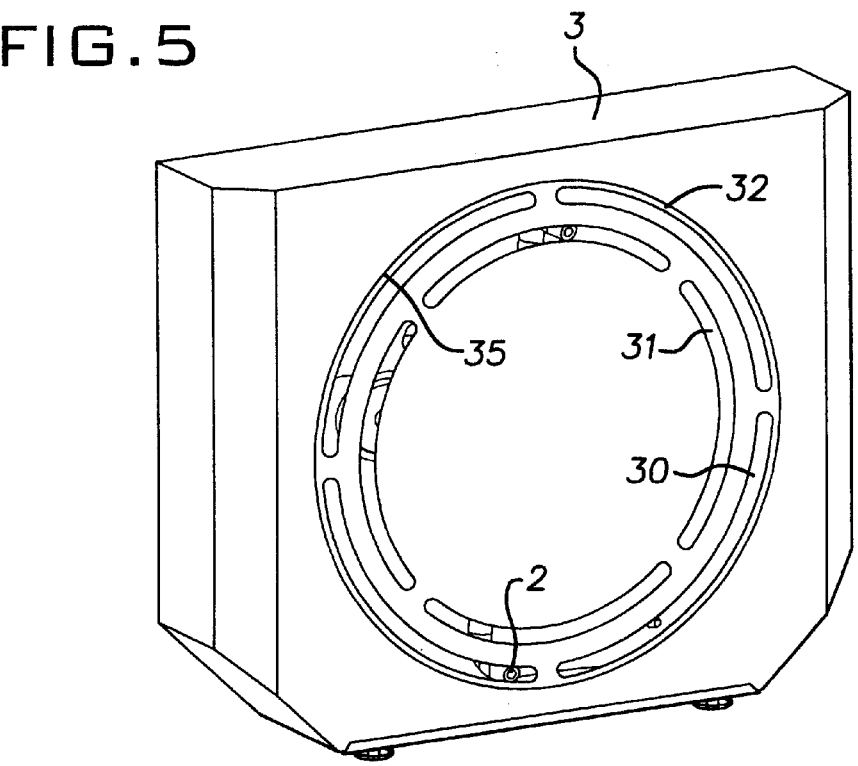
FIG. 5 is a front perspective view of a defoliator equipped with a mask for adjusting the slots in the deflector.

Examining FIG. 5, we can see that in this embodiment, circular slots 30 and 31 have been made in a mask 32 which is located in front of a circular opening 35 made in the wall of the vegetation deflector 3, which makes it possible, by permutation of masks, to instantly change the characteristics of slots 30 and 31, subject to having created beforehand a range of masks 32 covering almost all cases of defoliation.

Figure 6:
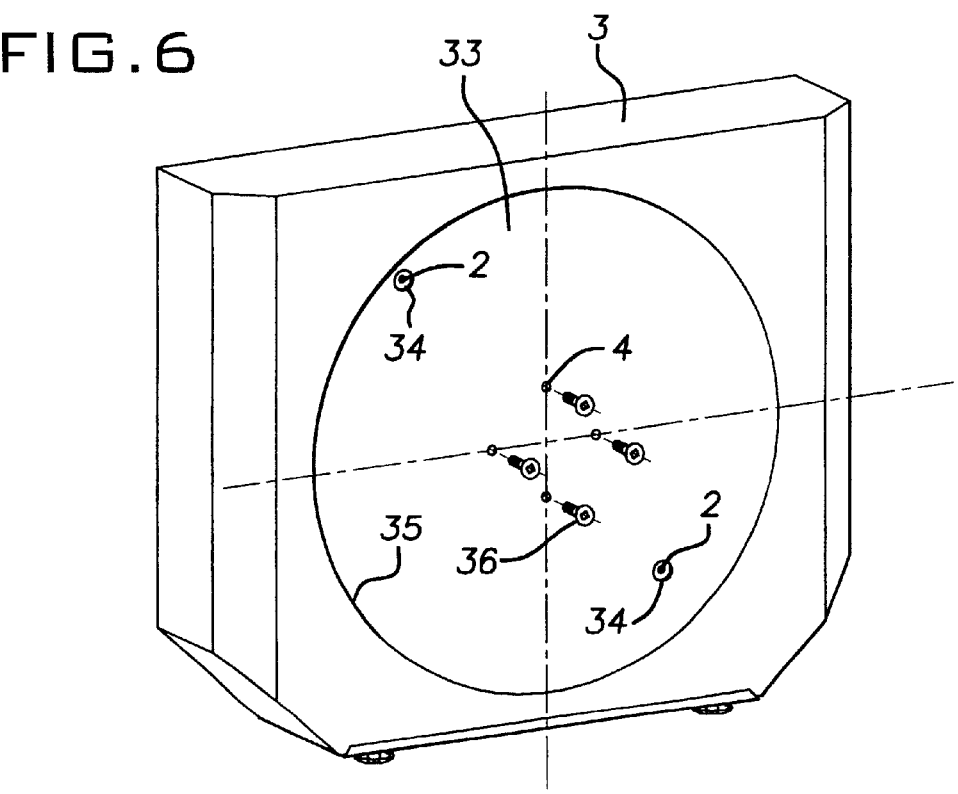
FIG. 6 is a front perspective view of a defoliator equipped with a rotary disk for controlled passage of the compressed gas jets through the vegetation deflector.

Looking now at FIG. 6, we find that, in this other embodiment, a disk 33 is mounted with screws 36 mounted in threaded holes 4 against the distributor. The disk 33 rotates integrally with the nozzles 2. The disk 33 is arranged in the circular opening 35 made in the deflector. The compressed gas jets traverse the disk 33 through orifices 34 located in front of each nozzle 2. Other orifices (not shown) at different distances from the Y axis can be made to allow different adjustments of the radius of gyration of the nozzles 2.

Figure 7A:
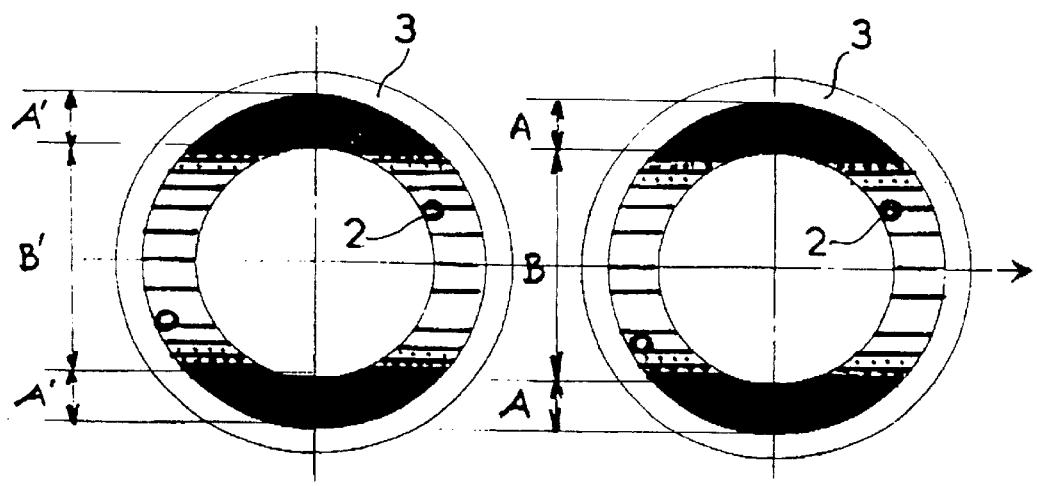
FIGS. 7a and 7b are schematic views of two defoliators mounted in tandem.
Figure 7B:
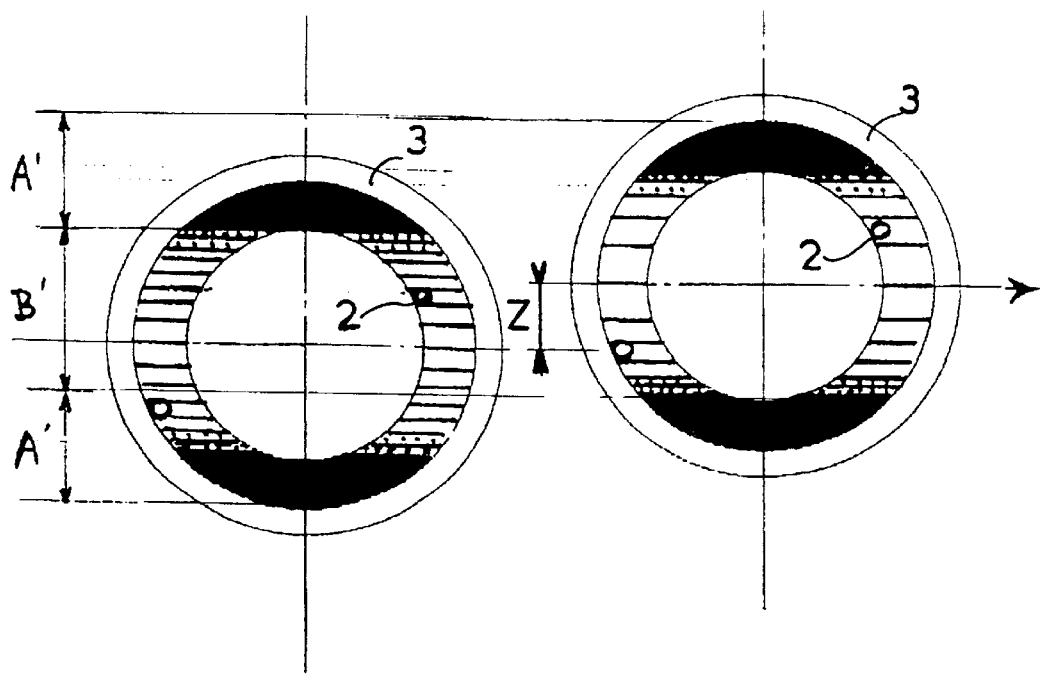

Now, examining FIGS. 7a and 7b in succession, note first of all on FIG. 7a that the defoliation is different in zones A and B, covered during displacement of the defoliator, corresponding to the top and bottom parts and the central part of it, respectively. The maximum defoliation zone corresponds to zones A, and the minimum defoliation zone corresponds to zone B: this takes into account the circular shape of slots 30, 31 and the linear displacement of the defoliator.

On FIG. 7b, note that it is possible to increase the width of zones A to obtain zones A', by reducing zone B', by mounting two defoliators in tandem, as shown in FIG. 7a, then offset from them by a value Z in the direction of the height.

It is also possible, by this means, to boost the effectiveness of the defoliation further or to moderate it by adjusting the distance Z, vertically separating the two defoliators so as to protect the fruit-bearing areas, for example.

Figure 8:
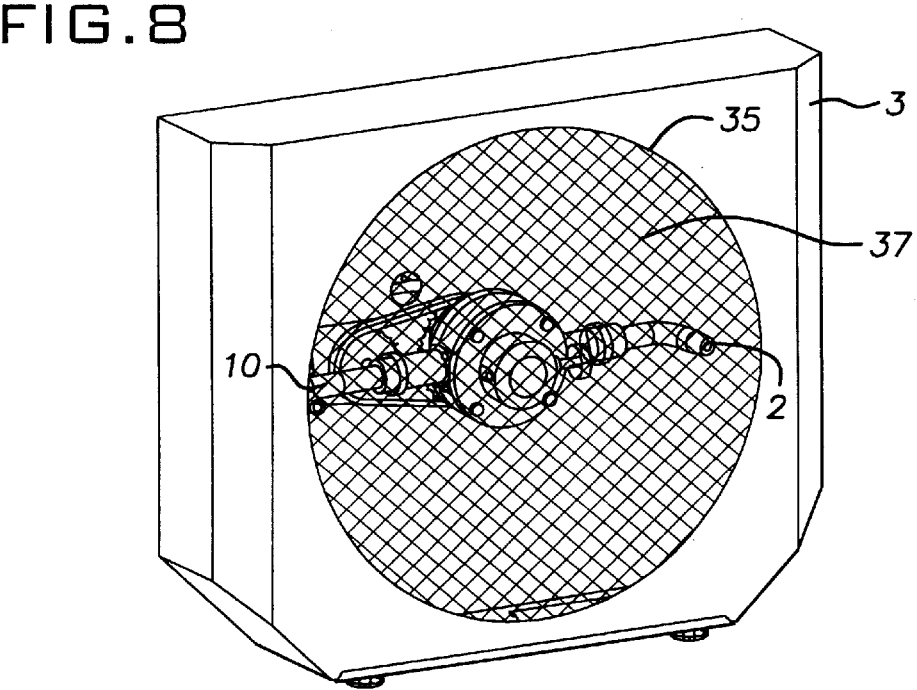
FIG. 8 is a front perspective view of a defoliator equipped with a grid for controlled passage of the compressed gas jets through the vegetation deflector.

As set forth above, in a third embodiment of the invention, the means of controlled passage of the compressed gas jets is composed of a grid. Referring to FIG. 8, passage of the compressed air from the nozzles 2, through the vegetation deflector 3 is controlled by a grid 37 located in an opening 35 in the deflector 3, behind which are the rotating pipes 10 and nozzles 2.

As set forth above, coming out of the compressor which supplies the nozzles with compressed gas, the defoliator in the invention also has a system for regulating the pressure that includes, besides a manometer for controlling the pressure, a safety valve that can be set at a given pressure and a valve that can be maneuvered manually or electronically from the tractor control post.

The regulation system make it possible to regulate the pressure, which must be adapted to the type of vegetation to be treated, the period involved and the parameters of the tractor that carries the defoliator and drives the compressor supplying it.

Figure 9:
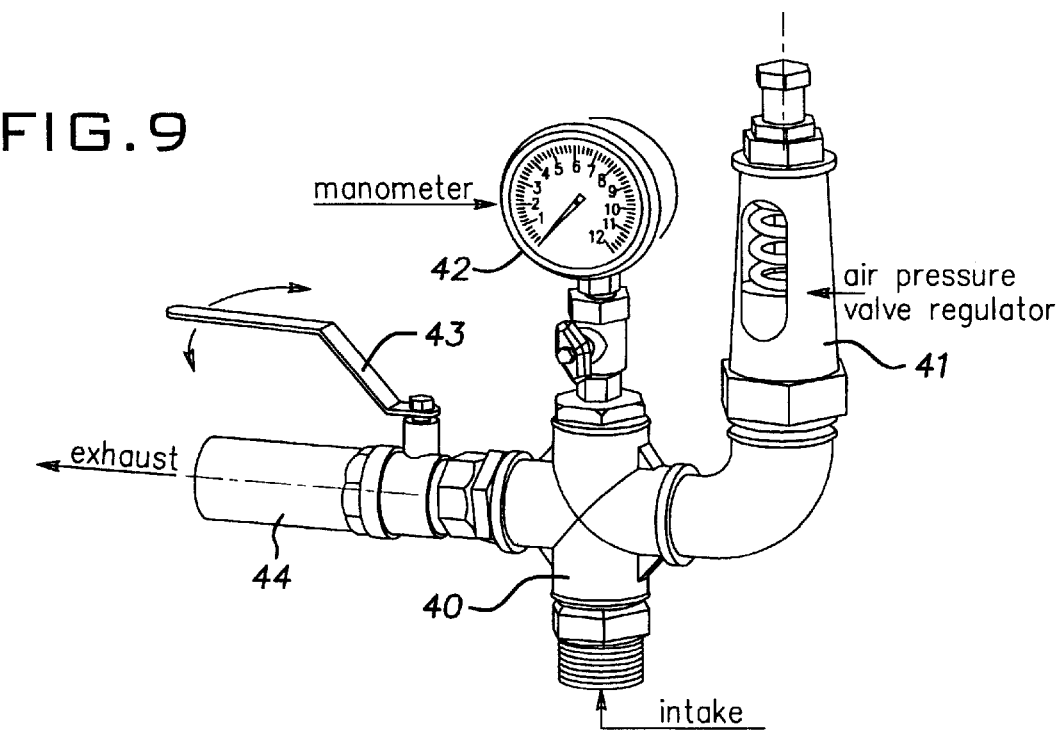
FIG. 9 is a front perspective view of the means of regulating the gas pressure.

Referring to FIG. 9, the pressure is set at a given pressure by a regulator valve 41 and a manometer 42. A four-way fitting 40 comes out of the compressor and by the valve 41, manometer 42 and the exhaust pipe 44 supplies the nozzles 2 by the valve 43 which can be maneuvered from the tractor control post.

The invention is not limited to the example of embodiment, which was given of it, nor to the field of use which was chosen, since it could have other uses, subject to adaptations obvious to a person skilled in the art that would not go beyond its framework.

What is claimed is:

1. A defoliator employing a compressed gas to defoliate vegetation, said defoliator comprising:
   a rotary distributor of said compressed gas;
   a plurality of pipes interlocked radially with said distributor;
   a nozzle mounted on each of said pipes, said nozzle being adapted to provide a jet of gas for defoliation; and
   a vegetation deflector, said distributor, pipes and nozzles being adapted to rotate behind said deflector, wherein at least two of said nozzles are distributed over different concentric circles, at least one of said circles having an adjustable radius and the deflector being adaptable to said adjustable radius, wherein at least one of said pipes includes a sleeve and a clamping chuck attached radially to the distributor to permit sliding adjustment of said adjustable radius.

2. A defoliator employing a compressed gas to defoliate vegetation, said defoliator comprising:
   a rotary distributor of said compressed gas;
   a plurality of pipes interlocked radially with said distributor;
   a nozzle mounted on each of said pipes, said nozzle being adapted to provide a jet of gas for defoliation; and
   a vegetation deflector, said distributor, pipes and nozzles being adapted to rotate behind said deflector, wherein at least two of said nozzles are distributed over different concentric circles, at least one of said circles having an adjustable radius and the deflector being adaptable to said adjustable radius, wherein the nozzles are substantially parallel to the axis of rotation of the distributor.

3. A defoliator employing a compressed gas to defoliate vegetation, said defoliator comprising:
   a rotary distributor of said compressed gas;
   a plurality of pipes interlocked radially with said distributor;
   a nozzle mounted on each of said pipes, said nozzle being adapted to provide a jet of gas for defoliation; and
   a vegetation deflector, said distributor, pipes and nozzles being adapted to rotate behind said deflector, wherein at least two of said nozzles are distributed over different concentric circles, at least one of said circles having an adjustable radius and the deflector being adaptable to said adjustable radius, wherein said deflector has a circular opening adapted to stationarily receive a desired mask of an interchangeable set of masks, each mask having different curved slots, said desired mask having slots that cooperate with said nozzles to provide defoliation.

4. A defoliator according to claim 3, wherein a mask has a wider slot to cooperate with two or more nozzles distributed over closely spaced concentric circles.

5. A defoliator employing a compressed gas to defoliate vegetation, said defoliator comprising:
   a rotary distributor of said compressed gas;
   a plurality of pipes interlocked radially with said distributor;
   a nozzle mounted on each of said pipes, said nozzle being adapted to provide a jet of gas for defoliation; and
   a vegetation deflector, said distributor, pipes and nozzles being adapted to rotate behind said deflector, wherein at least two of said nozzles are distributed over different concentric circles, at least one of said circles having an adjustable radius and the deflector being adaptable to said adjustable radius, wherein said deflector has a circular opening adapted to receive a desired mask of an interchangeable set of masks, each mask having a different arrangement of orifices for the passage of gas, said desired mask being mountable to rotate with said distributor, pipes and nozzles and the orifices of said desired mask cooperating with said nozzles to provide defoliation.

6. A defoliator employing a compressed gas to defoliate vegetation, said defoliator comprising:
   a rotary distributor of said compressed gas;
   a plurality of pipes interlocked radially with said distributor;
   a nozzle mounted on each of said pipes, said nozzle being adapted to provide a jet of gas for defoliation; and
   a vegetation deflector, said distributor, pipes and nozzles being adapted to rotate behind said deflector, wherein at least two of said nozzles are distributed over different concentric circles, at least one of said circles having an adjustable radius and the deflector being adaptable to said adjustable radius, wherein said deflector has an opening covered by an open grid that cooperates with said nozzles to provide defoliation.

7. A defoliator employing a compressed gas to defoliate vegetation, said defoliator comprising:
   a rotary distributor of said compressed gas;
   a plurality of pipes interlocked radially with said distributor;
   a nozzle mounted on each of said pipes, said nozzle being adapted to provide a jet of gas for defoliation; and
   a vegetation deflector, said distributor, pipes and nozzles being adapted to rotate behind said deflector, wherein at least two of said nozzles are distributed over different concentric circles, at least one of said circles having an adjustable radius and the deflector being adaptable to said adjustable radius, further comprising means for adjusting the compressed gas pressure.

8. A defoliator according to claim 7, wherein said adjusting can be performed from a control post located at a vehicle driving said defoliator.

9. A defoliation process that uses two of the defoliators of claim 1, 2, 3, 5, 6, or 7, the defoliators being arranged one after the other and offset vertically from each other, the offset being related to the height and width of the vegetation.

* * * * *